US008146483B2

(12) United States Patent
Lemaire et al.

(10) Patent No.: US 8,146,483 B2

(45) Date of Patent: Apr. 3, 2012

(54) PISTON FOR RADIAL PISTON HYDRAULIC ENGINE AND METHOD FOR MAKING SAME

(75) Inventors: Gilles Lemaire, Margny lés Compiégne (FR); Alain Noel, Brech (FR)

(73) Assignee: Poclain Hydraulics Industrie, Verberie (FR)

(*) Notice: Subject to any disclaimer, the term of this patent is extended or adjusted under 35 U.S.C. 154(b) by 687 days.

(21) Appl. No.: 12/295,904

(22) PCT Filed: Apr. 4, 2007

(86) PCT No.: PCT/FR2007/051061

§ 371 (c)(1), (2), (4) Date: Dec. 11, 2008

(87) PCT Pub. No.: WO2007/113449

PCT Pub. Date: Oct. 11, 2007

(65) Prior Publication Data

US 2009/0183629 A1 Jul. 23, 2009

(30) Foreign Application Priority Data

Apr. 5, 2006 (FR) ..................................... 06 51203

(51) Int. Cl.
*F16J 1/00* (2006.01)

(52) U.S. Cl. ........................................................ 92/172

(58) Field of Classification Search ................ 92/58, 72, 92/129, 172, 187; 91/491
See application file for complete search history.

(56) References Cited

U.S. PATENT DOCUMENTS

| | | | | |
|---|---|---|---|---|
| 4,095,513 | A * | 6/1978 | Block | 92/187 |
| 5,081,906 | A * | 1/1992 | Lemaire et al. | 91/491 |
| 5,090,295 | A * | 2/1992 | Cunningham et al. | 91/491 |
| 6,588,319 | B2 * | 7/2003 | Maganhoto | 92/187 |
| 7,051,644 | B2 * | 5/2006 | Park | 92/187 |

FOREIGN PATENT DOCUMENTS

| | | | |
|---|---|---|---|
| DE | 198 59 199 | A1 | 7/2000 |
| DE | 100 07 686 | C1 | 8/2001 |
| FR | 2 368 619 | A1 | 5/1978 |
| FR | 2 648 512 | A1 | 12/1990 |
| FR | 2 899 285 | A1 | 10/2007 |

OTHER PUBLICATIONS

International Search Report—PCT/FR2007/051061.

* cited by examiner

*Primary Examiner* — Michael Leslie

(74) *Attorney, Agent, or Firm* — Ladas & Parry LLP

(57) ABSTRACT

A piston including a body having a guiding and sealing surface, a base, and a top, which top is provided with a cradle-shaped recess in which a journal-bearing lining is retained by stop surfaces formed on the edges of the recess. The stop surfaces are formed by deforming the edges of the recess towards the inside thereof.

13 Claims, 5 Drawing Sheets

FIG.1
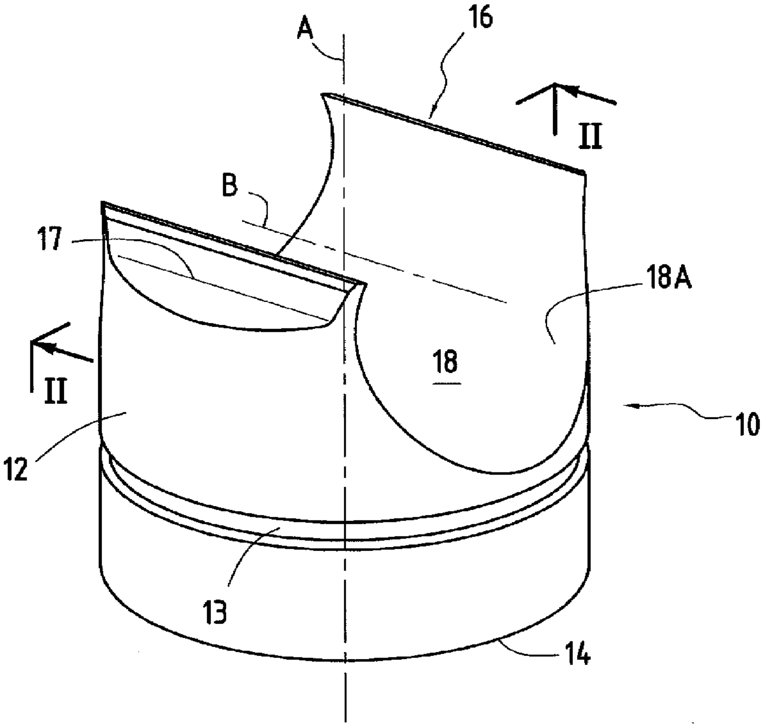
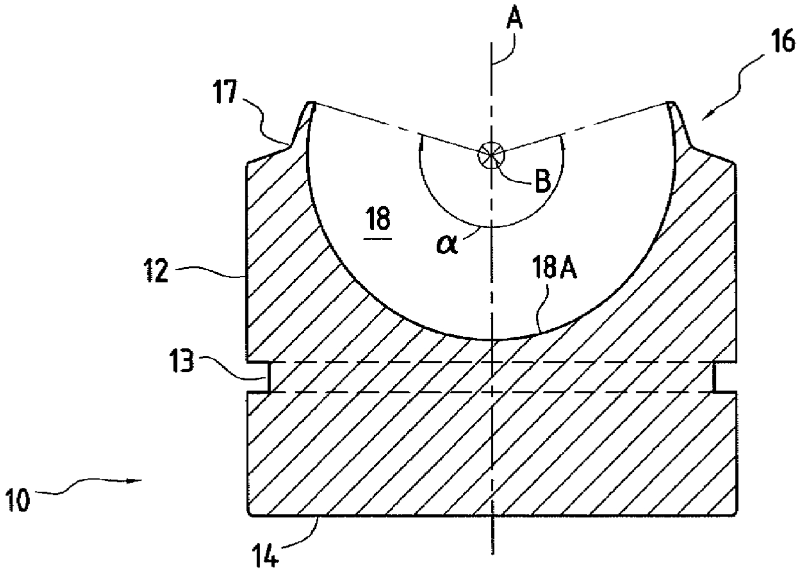
FIG.2

FIG.3
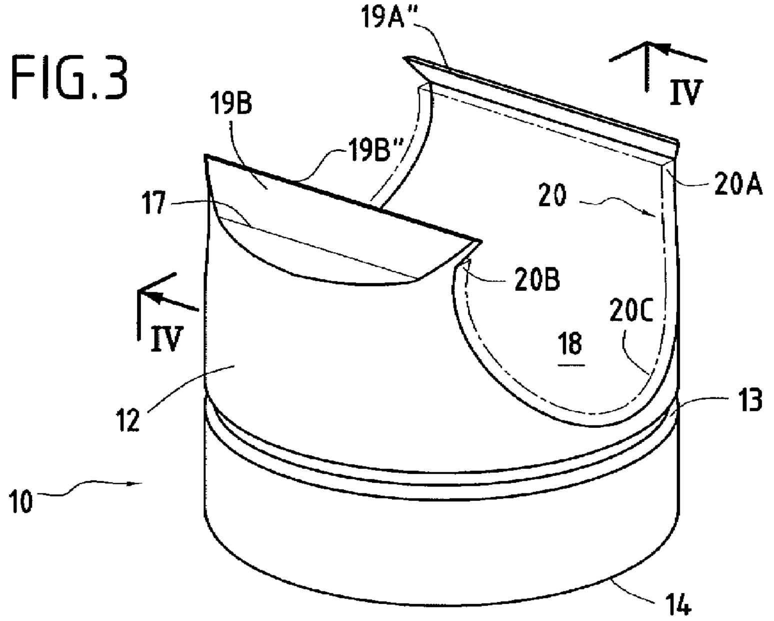
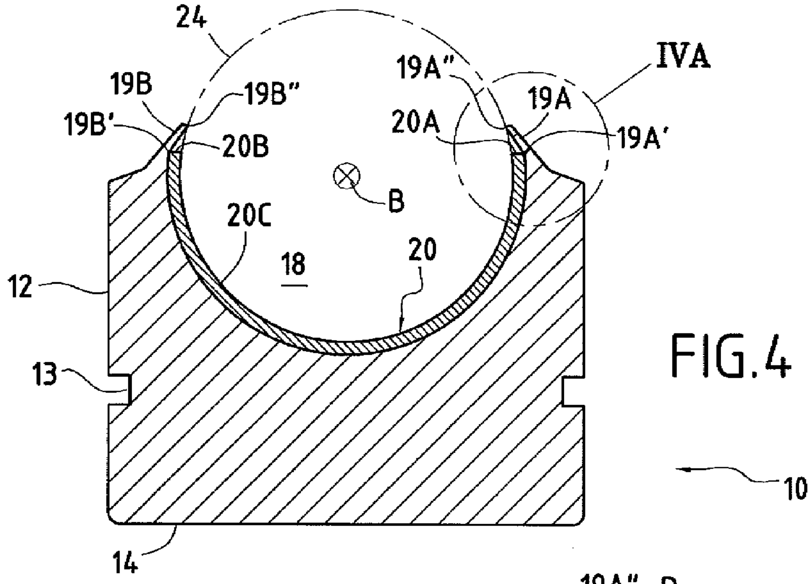
FIG.4
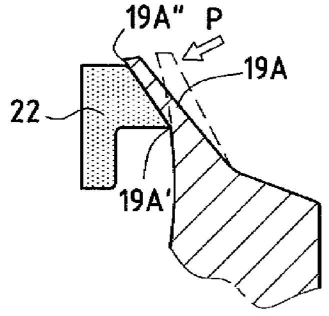
FIG.4A

FIG.5
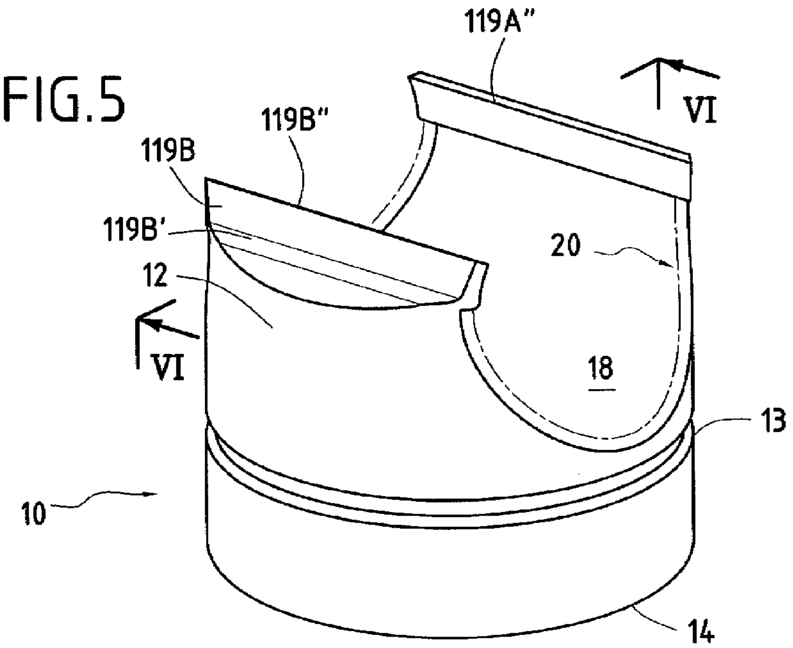
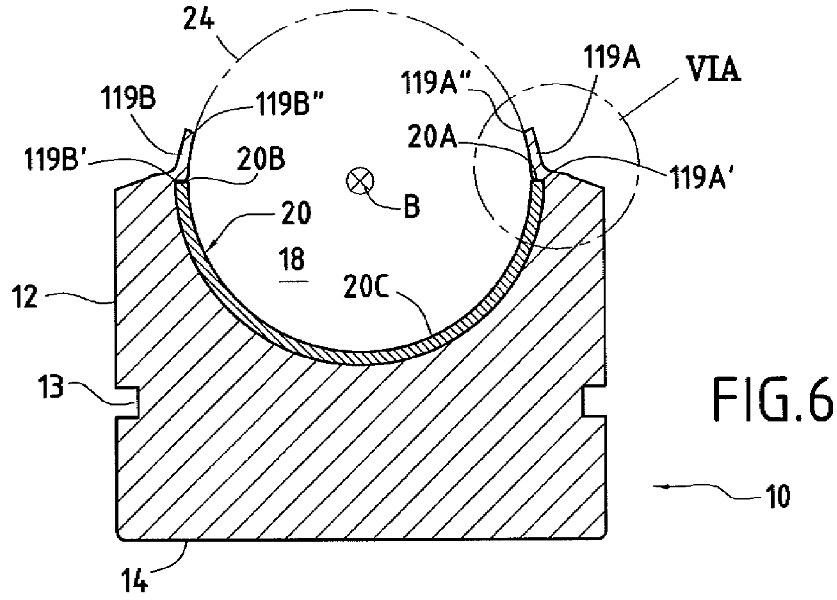
FIG.6
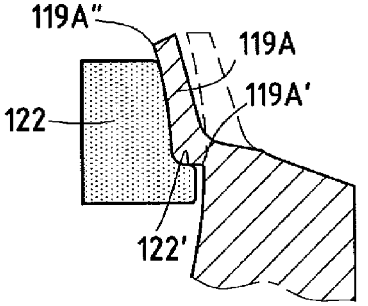
FIG.6A

FIG.7
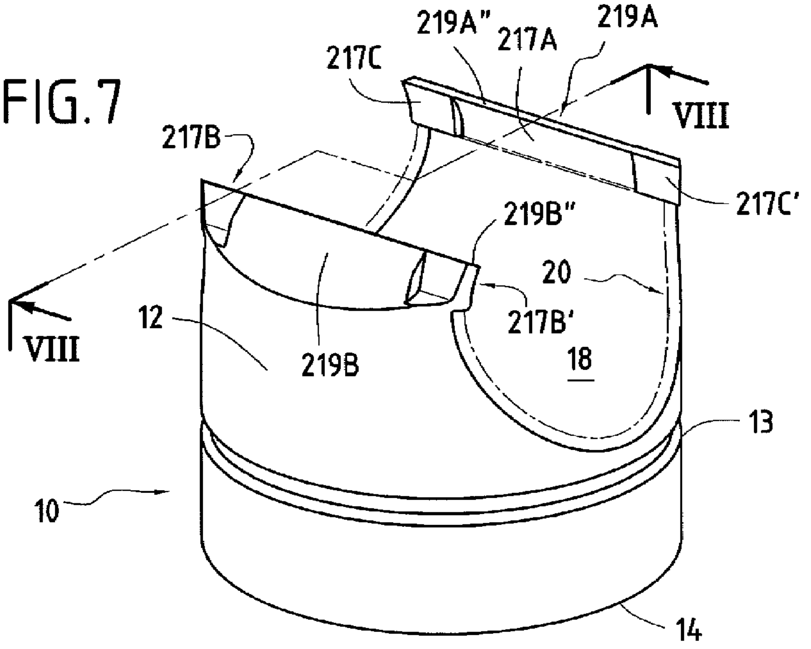
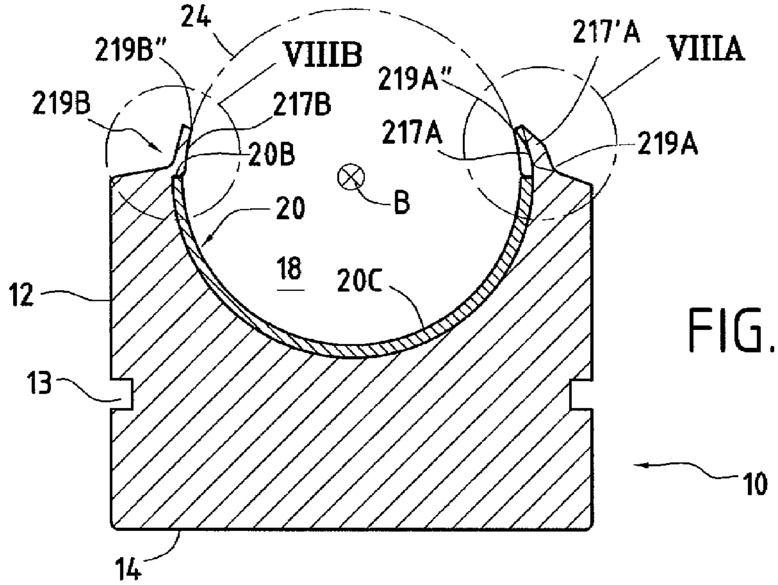
FIG.8
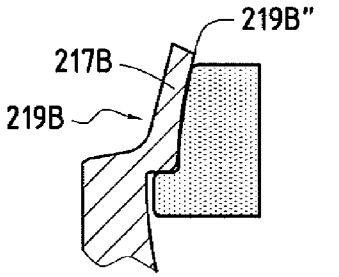
FIG.8B
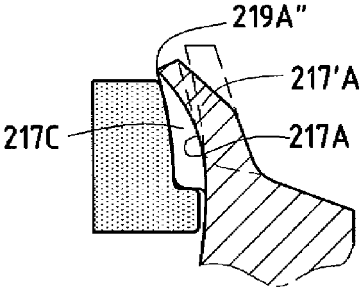
FIG.8A

FIG.9
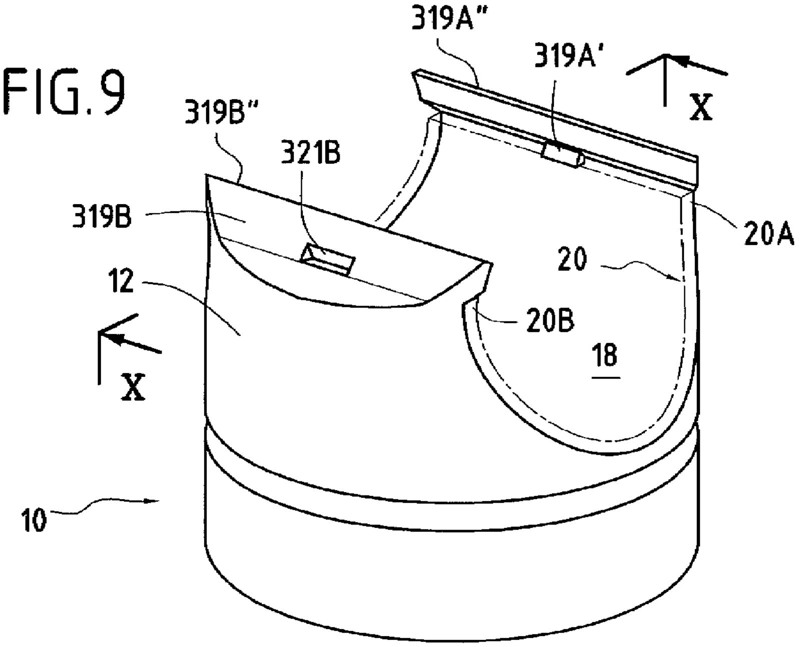
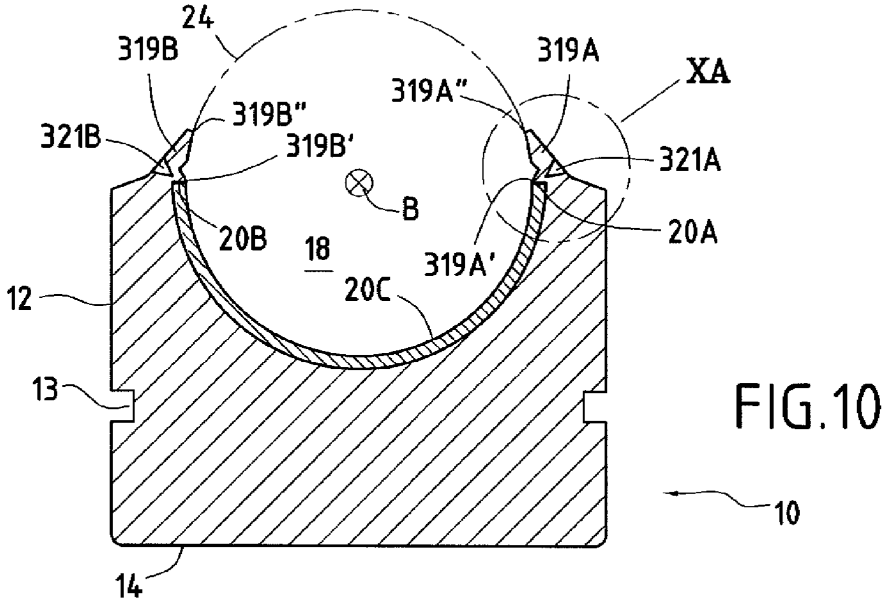
FIG.10
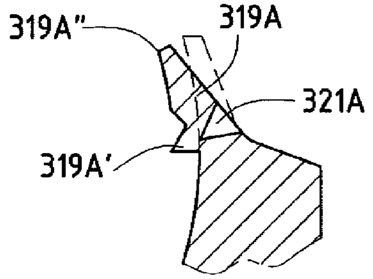
FIG.10A

PISTON FOR RADIAL PISTON HYDRAULIC ENGINE AND METHOD FOR MAKING SAME

BACKGROUND OF THE INVENTION

The present invention relates to a piston for a hydraulic motor having radial pistons, said piston comprising a body having a guiding and sealing surface, a base, and a top, which top is provided with a cradle-shaped recess whose edges that are situated at the top of the body offer stop surfaces for retaining a cradle-shaped journal-bearing lining that is disposed against the surface of said recess.

The cradle-shaped recess in the top of the piston serves to receive a roller or wheel designed to roll on the cam of the radial-piston hydraulic motor. While a radial-piston motor is operating, the cylinder block and the cam of said motor move in rotation relative to each other, and the pistons move radially in reciprocating motion inside the cylinders of the cylinder block, their above-mentioned rollers rolling on the cam.

For each piston, the cradle-shaped journal-bearing lining that is disposed against the surface of the recess, i.e. against the bottom thereof, receives, against it, the cylindrical surface of the roller disposed in the recess, and it is made of one or more friction-limiting materials so as to facilitate rolling of the roller.

FR 2 648 512 discloses a machine having radial pistons of the above-mentioned type. In each piston, the stop surfaces for stopping the lining are formed by shoulders that extend perpendicularly to the axis of the piston and that are obtained by machining (conventionally, by broaching) the surface of the recess. The roller is retained in the recess so that it is prevented from coming out of the recess in a direction parallel to the axis of the piston by the fact that the cradle-shaped recess extends over more than 180°, so that the edges of said recess define between them a distance that is less than the largest diametrical distance of the roller.

Such known cradle-shaped recesses, whose stop surfaces for retaining the lining are formed by machined shoulders are relatively complex to manufacture. In order to manufacture such a recess, it is necessary firstly to form the bottom of a cradle-shaped recess with a surface having the shape of a fraction of a cylinder, then to perform broaching by moving a broaching tool along the axis of said cylinder, perpendicularly to the axis of the piston, so as to cut deeper into the surface of the recess, thereby forming, in the vicinities of the edges thereof, the shoulders that face towards the bottom of the recess and that are to serve as stop surfaces. The broaching step is, in itself, costly, tedious, and lengthy.

An object of the invention is to improve the state of the art by proposing a piston that can be manufactured simply and at a lower cost.

This object is achieved by the fact that the stop surfaces for retaining the lining are formed over at least portions of the edges of the recess, in which portions the wall of the body is thinner and which portions are deformed towards the inside of the recess, by the fact that the edges of the recess also offer retaining surfaces for retaining a roller inserted into the recess, and by the fact that said retaining surfaces are formed over at least portions of the edges of the recess that are deformed towards the inside of the recess.

Thus, in accordance with the invention, the stop surfaces for retaining the lining are obtained merely by deforming edge portions of the recess inwards. Such deformations are simple and quick to implement. In addition, they can be localized on fractions only of the length of the recess, as measured along the axis of the partially cylindrical surface thereof. This makes it possible to simplify forming the deformations and to define the inside surface of the recess, as equipped with the lining, in a manner such as to avoid as much as possible having zones in relief that could be detrimental to proper rolling of the roller or wheel, or that could wear the surface thereof prematurely.

In addition, the retaining surfaces are also formed in a manner that is particularly simple.

Advantageously, a lining stop surface and a roller retaining surface are situated on the same deformation.

In this manner, the stop surface and the retaining surface are formed at the same time, at an extremely low cost.

Advantageously, at least one edge of the recess has at least one local zone in relief, namely at least one internal projection and/or at least one internal setback, extending over a fraction of the length of said edge, and advantageously situated in a middle region of said edge.

Said zone in relief can be a projection that serves as a stop surface for retaining the lining and/or as a retaining surface for retaining the roller, or else it can be a setback on either side of which two projecting surfaces serve as stop surfaces for retaining the lining and/or as retaining surfaces for retaining the roller.

The invention also relates to a method of manufacturing a piston for a hydraulic motor having radial pistons, said piston comprising a body having a guiding and sealing surface, a base, and a top, in which method a cradle-shaped recess is provided in the top of the body, and, on the edges of said recess that are situated at the top of the body, stop surfaces are formed for retaining a cradle-shaped journal-bearing lining that is disposed against the surface of said recess.

As indicated above, after the recess has been formed, known methods of obtaining such a piston require said recess to be cut deeper by means of a lengthy, tedious, and costly broaching step.

An object of the invention is to propose a method that makes it possible to avoid such a step.

This object is achieved by the fact the stop surfaces are formed by deforming towards the inside of the recess at least portions of the edges of the recess, in which portions the wall of the body is thinner, and by the fact that, also on the edges of the recess, retaining surfaces are formed for retaining a roller inserted into the recess, by deforming portions of the edges of the recess towards the inside thereof.

Advantageously, before portions of the edges of the recess are deformed, the top of the body of the piston is cut away in the vicinities of the edges of the recess so as to obtain edge zones of reduced thickness.

BRIEF DESCRIPTION OF THE DRAWING FIGURES

The invention can be well understood and its advantages appear more clearly on reading the following detailed description of embodiments shown by way of non-limiting example. The description refers to the accompanying drawings, in which:

FIG. 1 is a perspective view of a piston of the invention, while it is being manufactured;

FIG. 2 is a section view of FIG. 1 on plane II-II;

FIG. 3 is a perspective view of a first embodiment of a piston;

FIG. 4 is a section view on plane IV-IV of FIG. 3;

FIG. 4A is an enlargement of the edge portion IVA of the piston of FIG. 4;

FIG. 5 is a perspective view of another embodiment of the invention;

FIG. 6 is a section view on plane VI-VI of FIG. 5;

FIG. 6A is an enlargement of the edge portion VIA of the piston of FIG. 6;

FIG. 7 is a perspective view of another embodiment of a piston;

FIG. 8 is a section view on planes VIII-VIII of FIG. 7;

FIGS. 8A and 8B and detail views of edge portions VIIIA and VIIIB of the piston of FIG. 8;

FIG. 9 is a perspective view of another embodiment of a piston of the invention;

FIG. 10 is a section view on plane X-X of FIG. 9; and

FIG. 10A is an enlargement of edge portion XA of the piston of FIG. 10.

DETAILED DESCRIPTION OF THE PREFERRED EMBODIMENTS

The piston of FIG. 1 comprises a body 10 having a guiding and sealing surface 12, a base 14 and a top 16.

The guiding and sealing surface is substantially in the shape of a cylinder having a base that is circular or of some other shape, the cylindrical shape of the surface matching the shape of the cylinder in which the piston is designed to slide. The base of the piston is its end that, when the piston is installed in a cylinder of a radial-piston motor, is closer to the end wall of the cylinder. The top of the piston is opposite from its base.

The surface 12 is provided with an annular groove 13 designed to receive a sealing gasket or piston ring.

It can be seen that the top 16 of the piston is provided with a cradle-shaped recess 18. On the top of the piston, said recess forms a concave surface 18A that is substantially in the shape of a fraction of a cylinder of axis B perpendicular to the axis A of symmetry of the piston, which axis of symmetry is the axis along which the piston is designed to move in translation in a cylinder of a motor having radial pistons. In this example, the cradle-shaped recess 18 extends over at least 180° or indeed over a larger angle, as shown by the angle $\alpha$ measured from one edge of the recess to the other about the axis B.

For example, up to this stage, the piston can be manufactured as in the method described in French Patent Application No. 06 51131 filed in the Applicant's name on Mar. 31, 2006.

As indicated above, when the piston is in the final state, a journal-bearing lining is disposed against the surface of the recess, and is retained therein by the stop surface, and a roller or wheel is disposed to rotate in the lining and is held therein by a retaining surface. The lining is also cradle-shaped, i.e. its inside and outside surfaces are in the shape of a fraction of a cylinder of axis B (see, in particular, FIGS. 3 and 4). FIGS. 1 and 2 show the situation of the piston before the retaining surfaces are formed and before the lining is put in place. It can be observed that the top of the piston in the vicinities of the edges of the recess presents zones of reduced thickness from a cutaway zone 17.

FIGS. 3 and 4 show said stop and retaining surfaces as obtained in a first embodiment, in which the recess 18 receives a lining 20 that is retained in the recess by folding the edges 19A and 19B of the recess. With reference, in particular, to FIG. 4A, in which the initial shape of the edge 19A is indicated in dashed lines, it can be seen that said edge has merely been folded towards the bottom of the recess, by being folded in slightly towards the inside of the recess. As can be seen in FIG. 4A in which the lining is absent, this can be achieved by a tool exerting pressure on the outside face of the edge in the direction indicated by arrow P, substantially towards the axis B of the recess. Optionally, a backing tool 22 can be disposed inside the recess in order to guarantee proper folding.

The base of the folded portion of each edge 19A, 19B forms, in the recess, a fold line 19A', 19B' that is substantially parallel to the axis B, and via which the folded edge is connected to the partially cylindrical surface of the bottom of the recess. Said fold lines serve to retain respective ones of the edges 20A and 20B of the lining 20, which edges are also parallel to the axis B.

The edges 19A and 19B are folded, while taking account of the thickness of the lining 20, in a manner such that the inner free ends 19A", 19B" of said edges are situated in the vicinity of the virtual cylindrical surface defined by the outside surface 20C of the lining, the distance from the ends 19A", 19B" to the axis B preferably being very slightly less than the radius of the cylindrical outside surface 20C of the lining. Thus, from one end 19A" to the other end 19B", the recess as equipped with the lining substantially defines a cylindrical surface fraction that extends over more than 180°. Thus, a roller 24 can be received in the recess 18 as provided with the lining, and can also be retained by the free ends of the edges 19A and 19B so that it is prevented from being torn out parallel to the axis of the piston. In other words, the stop surfaces are, in this example, formed by the inner fold lines 19A', 19B' of the edges 19A and 19B, while, at the same time, retaining surfaces that make it possible to retain the roller are formed by the inner free ends 19A", 19B" of the edges 19A and 19B, which free ends are naturally also deformed towards the inside of the recess.

Thus, the lining stop surface 19A' or 19B' and the roller retaining surface 19A" or 19B" are situated on the same deformation of the edge 19A or 19B. However, it can be understood that, on an edge of the recess that presents a lining stop surface and a roller retaining surface, the lining stop surface is formed between the roller retaining surface and the bottom of the recess.

A description follows of the embodiment shown in FIGS. 5 and 6, in which the lining stop surfaces are also obtained by deformations over the entire length of the edges 119A, 119B of the recess, parallel to its axis B. In this embodiment, the deformation is effected by die-stamping as can be understood with reference to FIG. 6A in which the die 122 disposed inside the recess while the edges are being deformed is shown in part. The die 122 presents an axial shoulder 122', so that, while the edges 119A and 119B are being deformed, the inside surfaces thereof come to match the shape of the shoulder 122' in a manner such as to form the stop surfaces 119A' and 119B' in the form of shoulders that are parallel to the axis B of the recess. As can be seen in FIG. 6A, the entire edge portion 119A or 119B is pushed back against the die while it is being deformed. The inner free ends 119A" and 119B" of said edges are thus moved towards each other and it can be seen that, by choosing the die 122 appropriately relative to the lining 20, said inner edges, as in the embodiment shown in FIGS. 3 and 4, find themselves in the vicinity of the virtual cylindrical surface defined by the outside surface of the lining 20C so as to receive the roller 24 in the recess. The edges 20A and 20B of the lining are retained against the stop surfaces formed by the shoulders 119A' and 119B', while the cylindrical surface of the roller is retained by the edges formed at the inner free ends 119A" and 119B" of the edges of the recess.

A description follows of the embodiments of FIGS. 7 and 8, in which the stop surfaces are obtained by local pieces in relief on the inside surfaces of the edges 219A and 219B of the recess 18. More precisely, the perspective view of FIG. 7 shows that the edge 219A of the recess presents an internal setback 217A that extends over a fraction of the length of said edge (as measured along the axis B of the recess) and that is situated in a middle region of said edge. The same edge 219A presents two internal projections, respectively 217C and 217C' formed at the axial ends of said edge, and, between which, the above-mentioned setback 217A extends. In reality, the setback 217A is formed by a substantially non-deformed portion of the initial surface of the recess 18 of the piston of FIGS. 1 and 2, while, for forming the stop surfaces for retaining the lining 20 that are in the form of the internal projections 217C and 217C', only the axial ends of the edge 219A are pushed back inwards. The shape of the edge 219B of the recess is analogous to the shape of the edge 219A, with its internal protections 217B and 217B'.

It can be seen in FIG. 8A that, at the inside base of the edge 219A, i.e. in the region in which said edge is thinner than the remainder of the wall of the body of the piston, the surface of the setback 217A lies in alignment with the partially cylindrical surface of the bottom of the recess 18. It can also be seen in this figure that, conversely, the internal projection 217C projects into the recess relative to the above-mentioned surface. The two internal projections 217C and 217C' form axial shoulder portions that are aligned with each other and that serve as retaining surfaces for retaining the edges 20A of the lining 20. FIG. 8B, which shows a section view through the internal projection 217B that, on the edge 219B of the recess, corresponds to the internal projection 217C of the edge 219A, makes it possible to understand this feature clearly.

With reference to FIG. 8A, it can be seen that an end portion 217'A of the edge of the recess, in the setback region 217A, has been folded towards the inside of said recess. Thus, the inner free end 219A" of the edge 219A is formed substantially on the same straight line that is parallel to the axis B, and on which the free ends of the internal projections 217C and 217C' and the free end of the portion 217'A that is deformed find themselves. The same applies, on the edge 219B of the recess, for the free end 219B". This particular deformation makes it possible, for retaining the roller 24 disposed in the recess 18, to offer a retaining surface that is situated substantially on the cylindrical surface defined by the surface 20C of the lining.

A description follows of the embodiment of FIGS. 9 and 10, in which the edges 319A, 319B of the recess 18 are provided with internal projections, respectively 319A' and 319B', that extend over a fraction of the length of said edges and are situated in a middle region of said edges. Said internal projections 319A' and 319B' thus form stop surfaces for retaining the lining 20 disposed in the recess.

With reference to FIG. 10A, it can be seen that the edge 319A is also folded inwards slightly, so that its inner free end 319A" forms a retaining surface for retaining the roller, analogously to the inner free end 19A" of the piston of FIG. 4A.

The same applies on the other edge 319B of the recess and its free end 319B".

As indicated above, the method of the invention consists in deforming inwards at least portions of the edges of the recess. In FIGS. 3 and 4, this deformation is achieved merely by folding. However, the lining 20 can be present initially in the recess, in which case, the folding makes it possible to crimp the edges of the recess onto the edges of the lining. This also applies for the embodiment shown in FIGS. 5 to 8. As indicated above, the deformation can also be effected by means of die-stamping, the dies being shown in part in particular in FIGS. 6A, 8A, and 8B.

In the embodiment shown in FIGS. 9 and 10, a middle region of an edge of the recess 319A or 319B is advantageously punched in non-through manner from the outside of said recess (thereby leaving the external setbacks 321A and 321B visible) so as to obtain the internal projection 319A' or 319B' in the middle region.

Advantageously, when pushing back at least two portions of one edge of the recess towards the inside of said recess, one of the two portions is pushed back further than the other. This makes it possible to form both lining stop surfaces and roller retaining surfaces.

It is also possible, as in the embodiment shown in FIGS. 7 and 8, to push back two different portions substantially through the same amplitude but with the two portions being situated at different levels of the recess relative to a plane perpendicular to the axis of the piston and that contains the axis B of the recess, one of the portions then serving as a stop surface for retaining the lining, while the other portion serves as a retaining surface for retaining the roller.

It is indicated above that the wall of the body is thinner in the portions of the edges of the recess that are deformed inwards so as to form the lining stop surfaces and/or roller retaining surfaces. Said thinner walls can be obtained while making the body 10 of the piston, by suitably machining its outside periphery in the region of the top edges of the recess.

These thinner wall portions can be of substantially frustoconical shape, obtained by a turning operation or, as in the example shown, by milling forming flats parallel to the axis B. In any event, advantageously, before the portions of the edges of the recess are deformed, the top of the body of the piston is cut away in the vicinities of the edges of the recess so as to obtain zones of reduced thickness. Thus, as can be seen, e.g. in FIG. 2, a cutaway zone 17 defines a relatively sudden variation in the thickness of the body of the piston, as seen from outside the piston.

Preferably, the lining stop surface(s) and the roller retaining surface(s) of an edge of the recess are formed simultaneously, in the same deformation movement.

The invention claimed is:

1. A piston for a hydraulic motor having radial pistons, said piston comprising a body having a guiding and sealing surface, a base, and a top, which top is provided with a cradle-shaped recess whose that are situated at the top of the body offer stop surfaces for retaining a cradle-shaped journal-bearing lining that is disposed against the surface of said recess;

the stop surfaces for retaining the lining being formed over at least portions of the edges of the recess, in which portions of the wall of the body are thinner and which portions are deformed towards the inside of the recess, the edges of the recess offering retaining surfaces for retaining a roller inserted into the recess, said retaining surfaces being formed over at least portions of the edges of the recess that are deformed towards the inside of the recess, wherein at least one edge of the recess has at least one local zone in relief, comprising at least one internal projection and at least one internal setback, extending over a fraction of the length of said edge.

2. A piston according to claim 1, wherein a lining stop surface and a roller retaining surface are situated on the same deformation.

3. A piston according to claim 1, wherein, on an edge of the recess that presents a lining stop surface and a roller retaining surface, the lining stop surface is formed between the roller retaining surface and the bottom of the recess.

4. A piston according to claim 1, wherein the local zone in relief is situated in a middle region of said edge.

5. A piston according to claim 1, wherein a lining is disposed in the recess, and the edges of said recess are crimped onto the edges of the lining.

6. A piston according to claim 1, provided with a cradle-shaped journal-bearing lining that is disposed against the bottom of the recess and that is retained by the stop surfaces co-operating with its edges, said piston also being provided with a roller that is inserted into the recess, on the lining, and whose cylindrical surface projects beyond the top of the body of the piston, the retaining surfaces co-operating with said cylindrical surface to retain the roller in the recess.

7. A method of manufacturing a piston for a hydraulic motor having radial pistons, said piston comprising a body having a guiding and sealing surface, a base, and a top, in which method a cradle-shaped recess is provided in the top of the body, and, on the edges of said recess that are situated at the top of the body, stop surfaces are formed for retaining a cradle-shaped journal-bearing lining that is disposed against the surface of said recess;

wherein the stop surfaces are formed by deforming towards the inside of the recess at least portions of the edges of the recess, in which portions the wall of the body is thinner, and, on the edges of the recess, retaining surfaces are formed for retaining a roller inserted into the recess, by deforming portions of the edges of the recess towards the inside thereof.

8. A method according to claim 7, wherein the portions of the edges of the recess are deformed by die-stamping.

9. A method according to claim 7, wherein, before portions of the edges of the recess are deformed, the top of the body of the piston is cut away in the vicinities of the edges of the recess so as to obtain edge zones of reduced thickness.

10. A method according to claim 7, wherein a middle region of an edge of the recess is punched in non-through manner, from the outside of said recess, so as to obtain an internal projection in said middle region.

11. A method according claim 7, wherein, when pushing back at least two portions of an edge of the recess towards the inside of the recess, one of the two portions is pushed back further than the other.

12. A method according to claim 7, wherein a lining is disposed in the recess and the edges of the recess are pushed back so as to crimp them onto the edges of the lining.

13. A piston for a hydraulic motor having radial pistons, said piston comprising a body having a guiding and sealing surface, a base, and a top, which top is provided with a cradle-shaped recess whose that are situated at the top of the body offer stop surfaces for retaining a cradle-shaped journal-bearing lining that is disposed against the surface of said recess;

the stop surfaces for retaining the lining being formed over at least portions of the edges of the recess, in which portions of the wall of the body are thinner and which portions are deformed towards the inside of the recess, the edges of the recess offering retaining surfaces for retaining a roller inserted into the recess, said retaining surfaces being formed over at least portions of the edges of the recess that are deformed towards the inside of the recess, wherein at least one edge of the recess has at least one local zone in relief, comprising at least one internal projection or at least one internal setback, extending over a fraction of the length of said edge.

* * * * *

UNITED STATES PATENT AND TRADEMARK OFFICE

CERTIFICATE OF CORRECTION

PATENT NO. : 8,146,483 B2
APPLICATION NO. : 12/295904
DATED : April 3, 2012
INVENTOR(S) : Gilles Lemaire and Alain Noel It is certified that error appears in the above-identified patent and that said Letters Patent is hereby corrected as shown below:

In the Claims

Column 6, lines 39-42, that portion of Claim 1 reading:

"which top is provided with a cradle-shaped recess whose that are situated at the top of the body offer stop surfaces for retaining a cradle-shaped journal-bearing lining that is disposed against the surface of said recess;"

should read:

--which top is provided with a cradle-shaped recess whose edges that are situated at the top of the body offer stop surfaces for retaining a cradle-shaped journal-bearing lining that is disposed against the surface of said recess;-- i.e., "edges" should be inserted.

Column 8, lines 12-16, that portion of Claim 13 reading:

"which top is provided with a cradle-shaped recess whose that are situated at the top of the body offer stop surfaces for retaining a cradle-shaped journal-bearing lining that is disposed against the surface of said recess;"

should read:

--which top is provided with a cradle-shaped recess whose edges that are situated at the top of the body offer stop surfaces for retaining a cradle-shaped journal-bearing lining that is disposed against the surface of said recess;-- i.e., "edges" should be inserted.

Signed and Sealed this
First Day of October, 2013

Teresa Stanek Rea
*Deputy Director of the United States Patent and Trademark Office*